(12) United States Patent
Bodtker et al.

(10) Patent No.: US 7,878,543 B2
(45) Date of Patent: Feb. 1, 2011

(54) BALL RAMP CLAMPING MECHANISM

(75) Inventors: Joen C. Bodtker, Flint, MI (US);
Shawn Haring, Flint, MI (US)

(73) Assignee: Nexteer (Beijing) Technology Co., Ltd.

( * ) Notice: Subject to any disclaimer, the term of this patent is extended or adjusted under 35 U.S.C. 154(b) by 359 days.

(21) Appl. No.: 12/036,861

(22) Filed: Feb. 25, 2008

(65) Prior Publication Data
US 2009/0212546 A1 Aug. 27, 2009

(51) Int. Cl.
*B62D 1/18* (2006.01)
(52) U.S. Cl. .......................................... 280/775; 74/493
(58) Field of Classification Search ................ 280/775; 74/492, 493
See application file for complete search history.

(56) References Cited

U.S. PATENT DOCUMENTS

| | | | |
|---|---|---|---|
| 5,088,767 A | * | 2/1992 | Hoblingre et al. ........... 280/775 |
| 5,921,577 A | | 7/1999 | Weiss et al. |
| 7,010,996 B2 | | 3/2006 | Schick et al. |
| 2005/0178231 A1 | | 8/2005 | Schick et al. |
| 2006/0196302 A1 | | 9/2006 | Hochmuth et al. |

FOREIGN PATENT DOCUMENTS

| WO | 2004069629 A1 | 8/2004 |
|---|---|---|
| WO | 2004089722 A1 | 10/2004 |

* cited by examiner

*Primary Examiner*—Eric Culbreth
(74) *Attorney, Agent, or Firm*—Cantor Colburn LLP

(57) ABSTRACT

A clamping mechanism having a static plate and a dynamic plate rotatable about a transverse axis relative to the static plate is disclosed. The static plate defines a plurality of static lifting ramps, and the dynamic plate defines a plurality of dynamic lifting ramps opposing the static lifting ramps. A roller is disposed between each opposing pair of the static lifting ramps and dynamic lifting ramps. The rollers move between a raised position and a recessed position in response to rotation of the dynamic plate relative to the static plate between a lock position and a release position. The lifting ramps are arranged in a spiral configuration relative to each other, with the dynamic lifting ramps substantially transverse to the static lifting ramps to force radial movement of the rollers relative to the transverse axis during rotational movement of the dynamic plate relative to the static plate.

21 Claims, 7 Drawing Sheets

BALL RAMP CLAMPING MECHANISM

BACKGROUND OF THE INVENTION

1. Field of the Invention

The subject invention relates to a clamping mechanism for an adjustable steering column assembly.

2. Description of the Prior Art

Vehicles often include a steering column assembly that is adjustable in at least one of a telescoping direction and a tilt (rake or pivot) direction. The steering column assembly typically includes a column jacket. The column jacket may include an upper jacket and a lower jacket, with the lower jacket in sliding engagement with the upper jacket along a longitudinal axis to permit adjustment of the steering column assembly in the telescoping direction. A mounting bracket mounts the column jacket to the vehicle, and typically defines a tilt axis about which the steering column assembly rotates to permit adjustment of the steering column assembly in the tilt direction. Typically, the steering column assembly further comprises a rake bracket. A clamping mechanism couples the column jacket to the rake bracket in a desired position. The clamping mechanism couples the column jacket to the rake bracket and is moveable between a lock position and a release position. The lock position restrains movement of the column jacket in the tilt direction and the telescoping direction relative to the rake bracket, and the release position permits movement of the column jacket in the tilt direction and the telescoping direction relative to the rake bracket.

There are several different styles of clamping mechanisms utilized in the adjustable steering column assembly. One suitable type of clamping mechanism is disclosed in U.S. Patent Application Publication No. 2006/0196302 A1 to Hochmuth et al. (the '302 application). The clamping device in the '302 application comprises a static plate and a dynamic plate. The static plate defines a plurality of static lifting ramps and is configured for attachment to the adjustable steering column assembly. The dynamic plate is in spaced parallel relationship to the static plate and is rotatable relative to the static plate about a transverse axis between a lock position and a release position. The transverse axis extends perpendicular to the dynamic plate and the static plate. The dynamic plate defines a plurality of dynamic lifting ramps. Each of the dynamic lifting ramps opposes one of the static lifting ramps to define opposing pairs of ramps.

The clamping mechanism further comprises a plurality of rollers. Each of the rollers is disposed within one of the opposing pairs ramps, and is moveable between a raised position and a recessed position within the opposing pair of ramps. The rollers are disposed in the raised position when the dynamic plate is in the lock position to bias the dynamic plate outward along the transverse axis away from the static plate. The rollers are disposed in the recessed position when the dynamic plate is in the release position to permit axial movement of the dynamic plate along the transverse axis toward the static plate.

The dynamic lifting ramps are arranged on an inner surface of the dynamic plate circumferentially along a continuous circular alignment concentric with the transverse axis, and the static lifting ramps are likewise arranged on an outer surface of the static plate circumferentially along a continuous circular alignment concentric with the transverse axis. Accordingly, the rollers are free to slip down the static lifting ramps and the dynamic lifting ramps without any corresponding rotational movement of the dynamic plate relative to the static plate, thereby releasing the clamping pressure provided by the clamping mechanism.

SUMMARY OF THE INVENTION AND ADVANTAGES

In one aspect of the subject invention, a clamping mechanism for an adjustable steering column is provided. The clamping mechanism comprises a static plate defining a plurality of static lifting ramps. Each of the plurality of static lifting ramps includes a release section and a lock section. The static plate is configured for attachment to the adjustable steering column assembly. A dynamic plate is in spaced parallel relationship to the static plate. The dynamic plate is rotatable relative to the static plate between a lock position and a release position. The dynamic plate is rotatable about a transverse axis, which extends perpendicular to the dynamic plate. The dynamic plate defines a plurality of dynamic lifting ramps. Each of the plurality of dynamic lifting ramps includes a release section and a lock section, and opposes one of the plurality of static lifting ramps to define opposing pairs of ramps. The clamping mechanism further comprises a plurality of rollers. Each of the plurality of rollers is disposed within one of the opposing pairs of ramps, and is moveable between a raised position and a recessed position within the opposing pair of ramps. The rollers are in the raised position when the dynamic plate is in the lock position to bias the dynamic plate outward along the transverse axis away from the static plate. The rollers are in the recessed position when the dynamic plate is in the release position to permit axial movement of the dynamic plate along the transverse axis toward the static plate. The plurality of static lifting ramps is arranged in a spiral relationship relative to each other. The release section of each of the plurality of static lifting ramps is spaced from the transverse axis a first radial release distance and the lock section of each of the plurality of static lifting ramps spaced from the transverse axis a first radial lock distance. The first radial lock distance is less than the first radial release distance. The plurality of dynamic lifting ramps is arranged in a spiral relationship relative to each other with the release section of each of the plurality of dynamic lifting ramps spaced from the transverse axis a second radial release distance and the lock section of each of the plurality of dynamic lifting ramps spaced from the transverse axis a second radial lock. The second radial lock distance is less than the second radial release distance.

In another aspect of the subject invention, a clamping mechanism for an adjustable steering column is also provided. The clamping mechanism comprises a static plate defining a plurality of static lifting ramps. Each of the plurality of static lifting ramps includes a release section and a lock section. The static plate is configured for attachment to the adjustable steering column assembly. A dynamic plate is in spaced parallel relationship to the static plate. The dynamic plate is rotatable about a transverse axis relative to the static plate between a lock position and a release position. The transverse axis extends perpendicular to the dynamic plate. The dynamic plate defines a plurality of dynamic lifting ramps. Each of the plurality of dynamic lifting ramps includes a release section and a lock section, and opposes one of the plurality of static lifting ramps to define opposing pairs of ramps. The clamping mechanism further comprises a plurality of rollers. Each of the plurality of rollers is disposed within one of the opposing pairs of ramps, and is moveable between a raised position and a recessed position within the opposing pair of ramps. The rollers are in the raised position when the dynamic plate is in the lock position to bias the dynamic plate outward along the transverse axis away from the static plate. The rollers are in the recessed position when the dynamic plate is in the release position to permit axial movement of the dynamic plate along the transverse axis toward the static plate. The release section and the lock section of each of the plurality of static lifting ramps are aligned along a first alignment, and the release section and the lock section of each of the plurality of dynamic lifting ramps are aligned along a second alignment. The second alignment is substantially transverse to the first alignment to permit radial movement of the plurality of rollers within the opposing pair of ramps relative to the transverse axis to guide the rollers between the recessed position and the raised position in response to rotation of the dynamic plate relative to the static plate.

Accordingly, the subject invention provides a clamping mechanism that prevents the rollers from slipping along the dynamic lifting ramps and the static lifting ramps without rotational movement of the dynamic plate relative to the static plate by requiring the rollers to move radially inward or outward relative to the transverse axis as the rollers move up or down the dynamic lifting ramps and the static lifting ramps. Because the rollers are mechanically secured in place, the clamping mechanism maintains a secure clamping pressure at all times.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
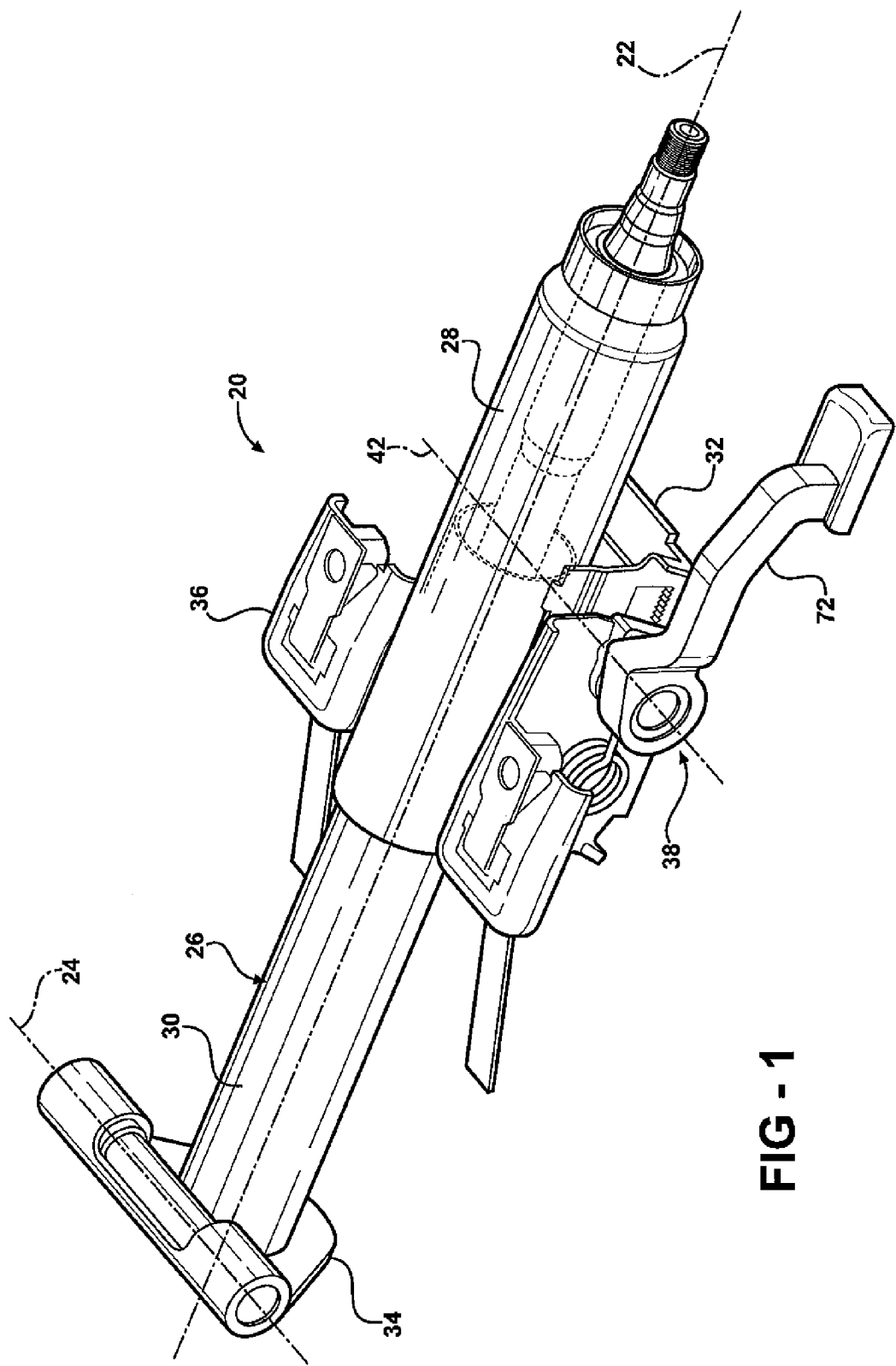
FIG. 1 is a perspective view of a steering column assembly.

Referring to the Figures, wherein like numerals indicate corresponding parts throughout the several views, an adjustable steering column assembly is shown generally at 20 in FIG. 1. Referring to FIG. 1, the steering column assembly 20 is adjustable in at least one of a telescoping direction along a longitudinal axis 22 and a tilt direction about a tilt axis 24.

The steering column assembly 20 includes a column jacket 26. The column jacket 26 includes an upper jacket 28 and a lower jacket 30. The lower jacket 30 is in sliding engagement with the upper jacket 28 along the longitudinal axis 22, thereby permitting adjustment of the steering column assembly 20 in the telescoping direction. A compression bracket 32 is fixedly mounted to one of the upper jacket 28 and the lower jacket 30. A mounting bracket 34 mounts the column jacket 26 to the vehicle. The mounting bracket 34 defines the tilt axis 24 about which the column jacket 26 rotates, thereby permitting adjustment of the steering column assembly 20 in the tilt direction. The steering column assembly 20 further comprises a rake bracket 36. The rake bracket 36 is mounted to the vehicle. A clamping mechanism 38 couples the column jacket 26 to the rake bracket 36 in a desired position. The clamping mechanism 38 couples the column jacket 26 to the rake bracket 36 by compressing the rake bracket 36 and the compression bracket 32 together to create a frictional force between the rake bracket 36 and the compression bracket 32 to prevent movement therebetween. It should be appreciated that the steering column assembly 20 may be configured in a manner other than shown or described herein, and may be assembled in a different manner and include other or different components.

Figure 2:
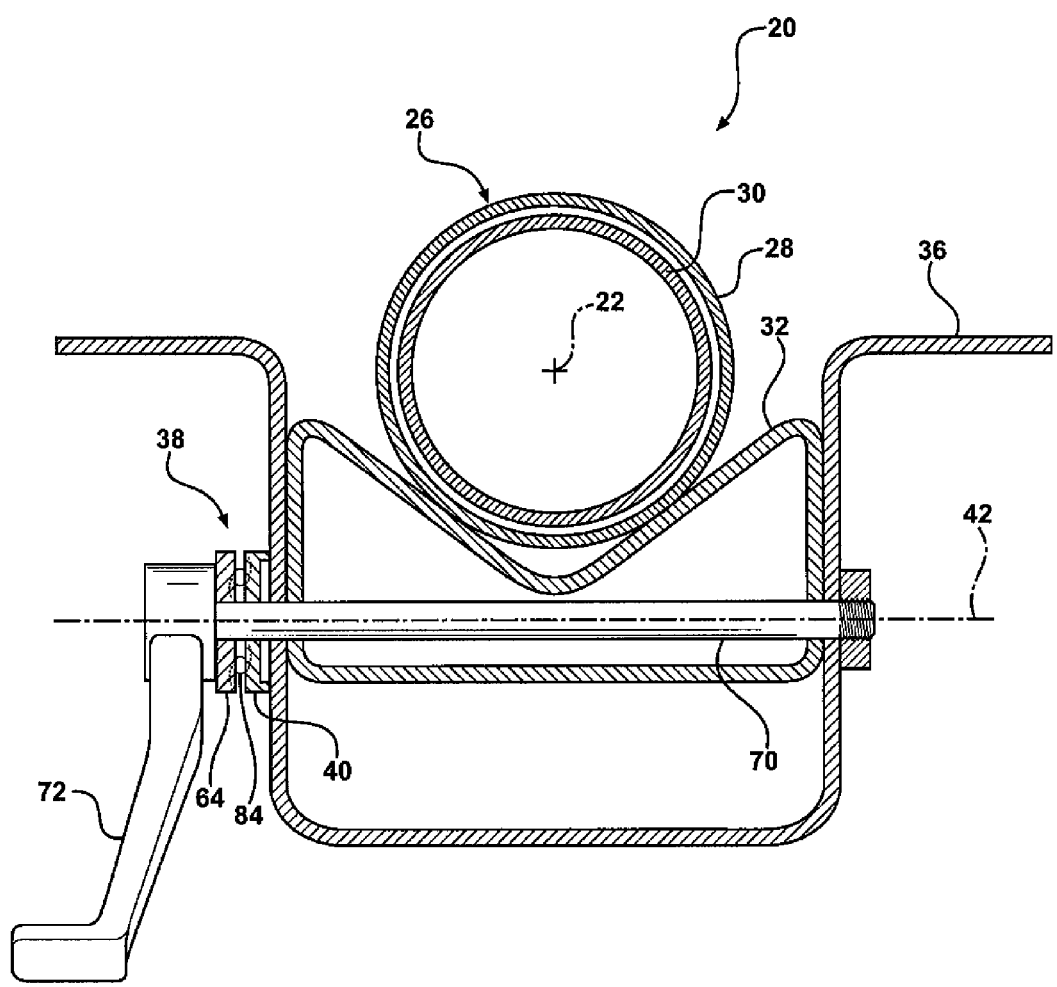
FIG. 2 is a cross sectional view of the steering column assembly.
Figure 3:
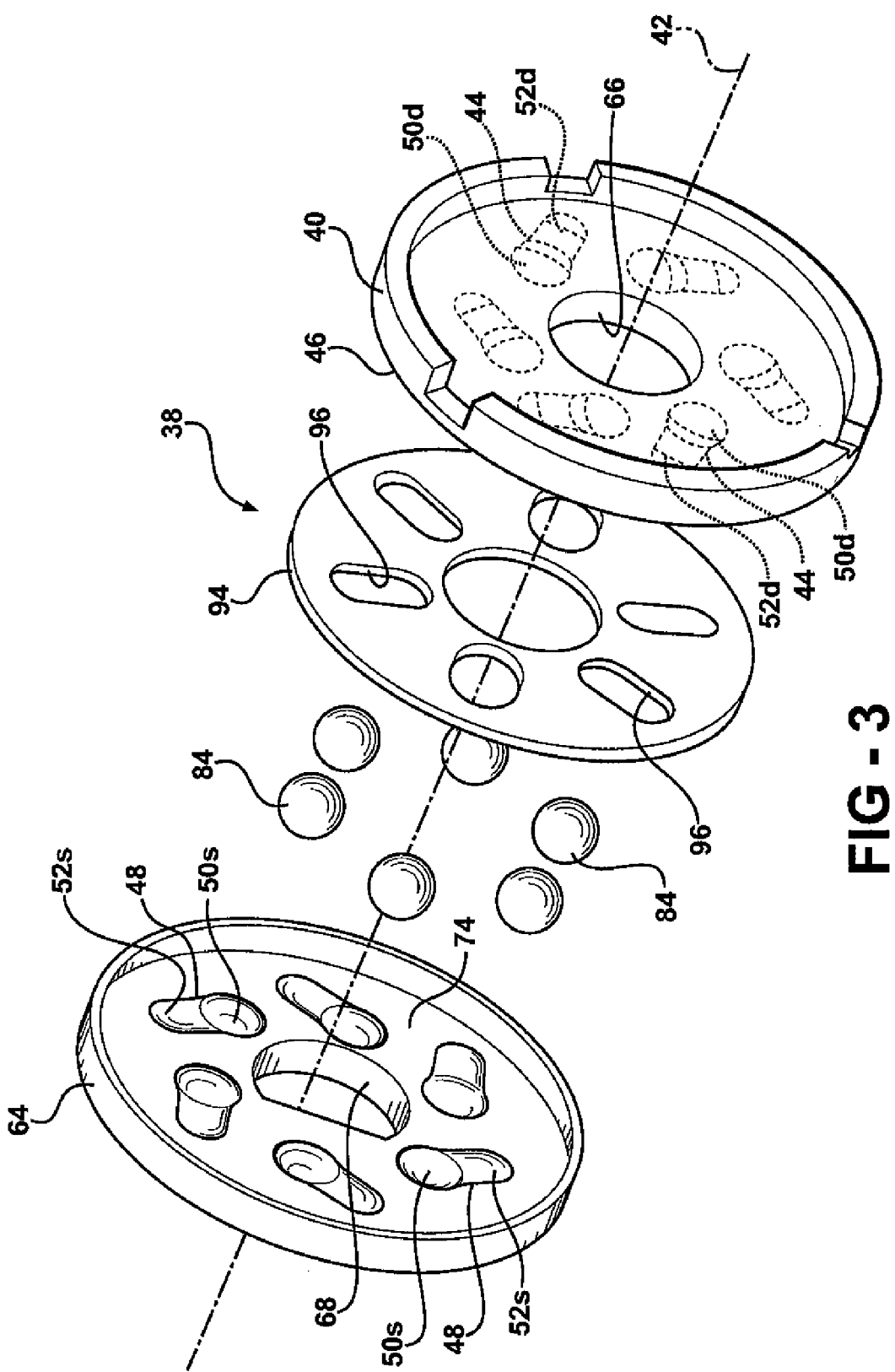
FIG. 3 is an exploded perspective view of a clamping mechanism.
Figure 7:
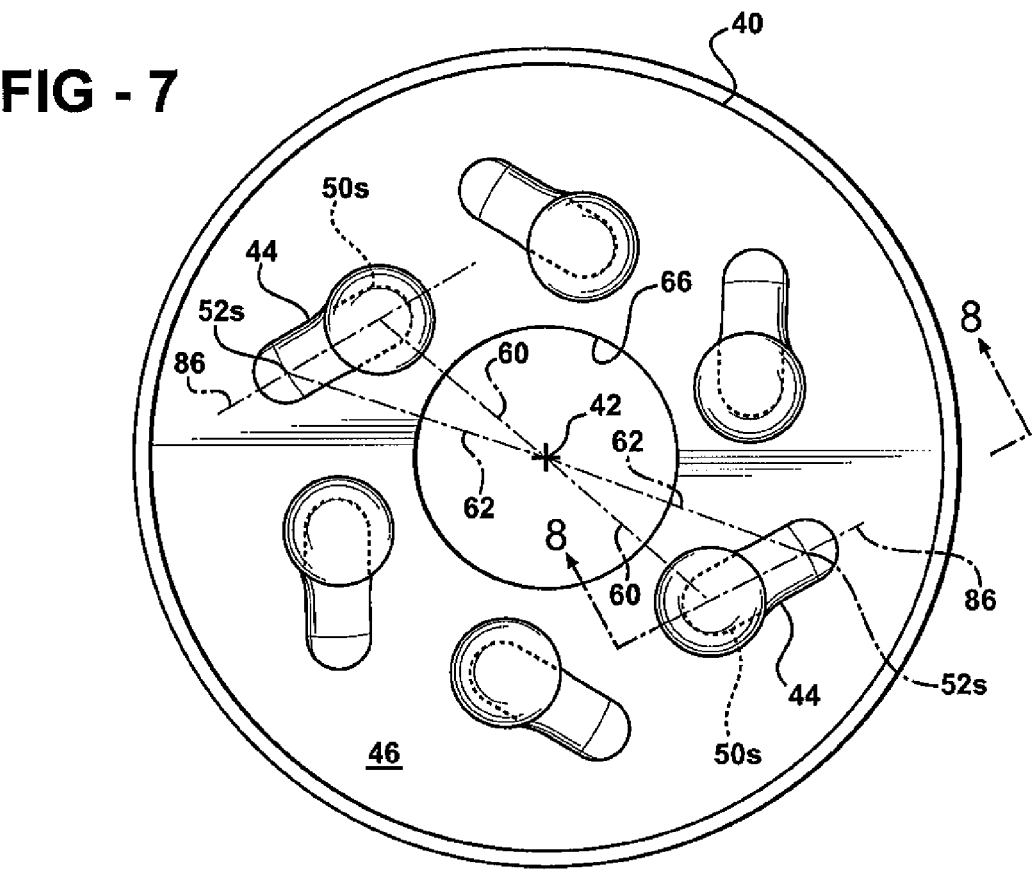
FIG. 7 is plan view of a static plate of the clamping mechanism.

Referring to FIGS. 2 and 3, the clamping mechanism 38 includes a static plate 40. The static plate 40 is mounted to the steering column assembly 20. As shown, the static plate 40 is mounted to the rake bracket 36. However, it should be appreciated that the static plate 40 may be mounted to some other component of the steering column assembly 20. A transverse axis 42 extends perpendicular to the static plate 40, transverse to the longitudinal axis 22, and across the column jacket 26. Referring to FIG. 7, the static plate 40 defines a plurality of static lifting ramps 44. The static plate 40 includes an outer surface 46 facing outward away from the rake bracket 36. The plurality of static lifting ramps 44 is recessed relative to the outer surface 46, i.e., the static lifting ramps 44 are ramps that are depressed into the outer surface 46 of the static plate 40.

Figure 8:
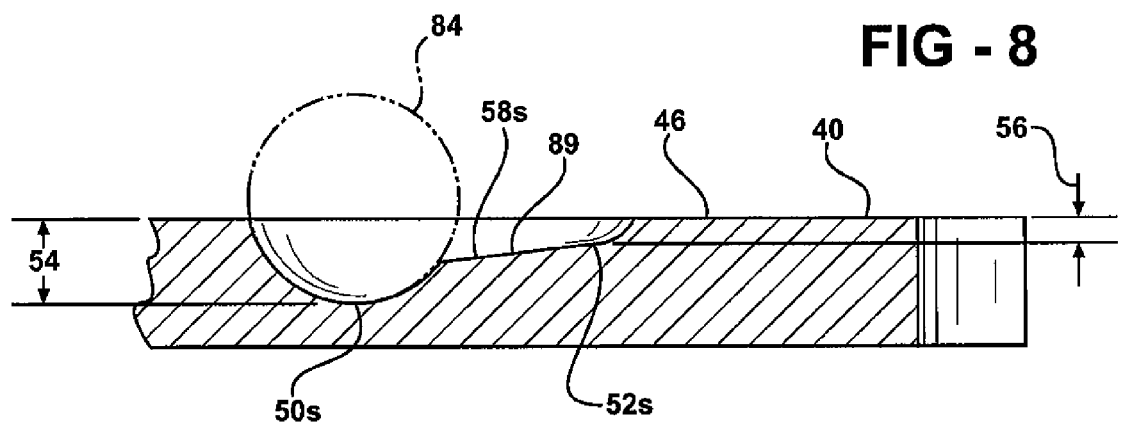
FIG. 8 is a cross sectional view of the static plate of the clamping mechanism along cut line 8-8 shown in FIG. 7.

Referring to FIG. 8, each of the plurality of static lifting ramps 44 includes a release section 50s and a lock section 52s. The release section 50s is spaced from the outer surface 46 of the static plate 40 a first axial release distance 54. The lock section 52s is spaced from the outer surface 46 of the static plate 40 a first axial lock distance 56. The first axial lock distance 56 is less than the first axial release distance 54. Accordingly, it should be appreciated that each of the static lifting ramps 44 includes an inclined profile 58s extending between the release section 50s of the static lifting ramps 44 and the lock section 52s of the static lifting ramps 44. The release section 50s defines the deepest part of the inclined profile 58s relative to the outer surface 46, and the lock section 52s defines the shallowest portion of the inclined profile 58s relative to the outer surface 46.

Referring back to FIG. 7, the plurality of static lifting ramps 44 is arranged in a spiral relationship relative to each other. Accordingly, the release section 50s of each of the plurality of static lifting ramps 44 is spaced from the transverse axis 42 a first radial release distance 60, and the lock section 52s of each of the plurality of static lifting ramps 44 is spaced from the transverse axis 42 a first radial lock distance 62. The first radial lock distance 62 is less than the first radial release distance 60. Therefore, it should be appreciated that the lock section 52s of each of the static lifting ramps 44 is spaced closer to the transverse axis 42 than the release section 50s of each of the static lifting ramps 44. It should also be appreciated that the relative position of the lock section 52s and the release section 50s may be reversed, with the first radial lock distance 62 being greater than the first radial release distance 60.

Referring back to FIGS. 2 and 3, a dynamic plate 64 is in spaced parallel relationship to the static plate 40. The dynamic plate 64 is rotatable relative to the static plate 40 between a lock position shown in FIG. 5 and a release position shown in FIG. 6. The dynamic plate 64 rotates about the transverse axis 42, which extends perpendicular to the dynamic plate 64.

Figure 9:
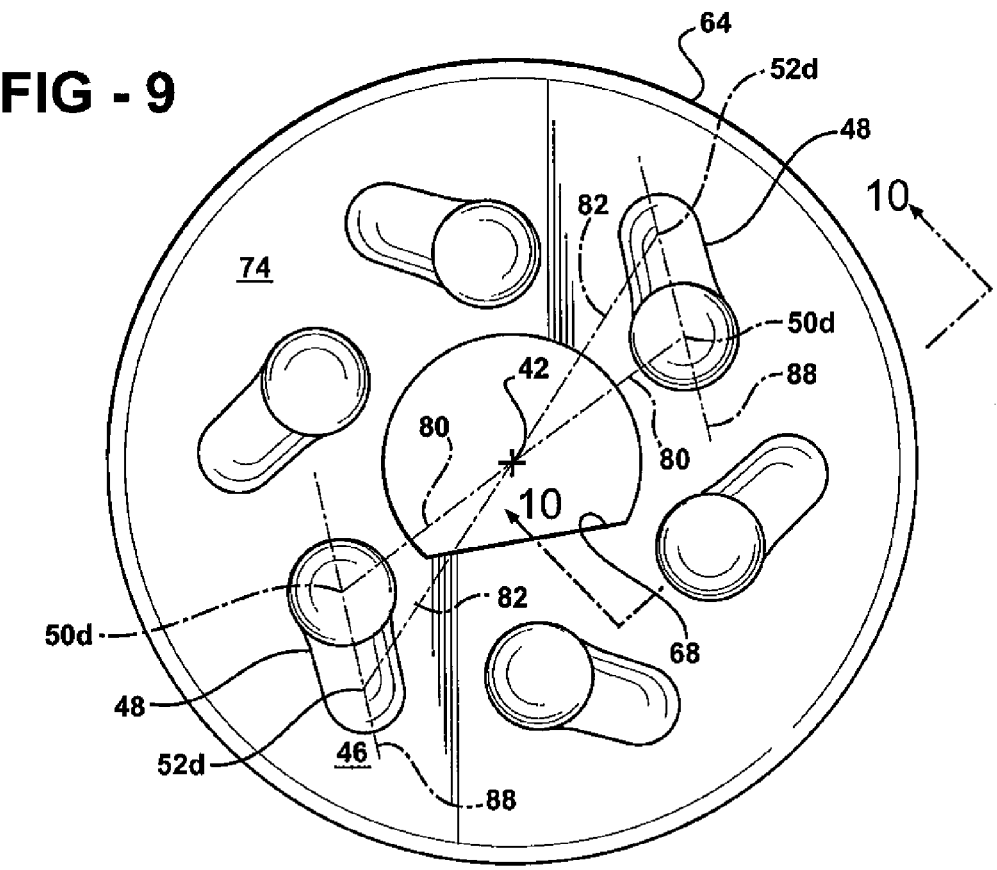
FIG. 9 is a plan view of a dynamic plate of the clamping mechanism.

As shown in FIG. 7, the static plate 40 defines a central bore 66 having a circular shape concentric with the transverse axis 42. Referring also to FIG. 9, the dynamic plate 64 defines a central aperture 68 concentric with the transverse axis 42. A shaft 70 extends through the central bore 66 of the static plate 40. The shaft 70 is coupled to and rotatable with the dynamic plate 64 about the transverse axis 42 relative to the static plate 40. The central aperture 68 includes a semicircular shape. The shaft 70 also includes a semicircular cross section in interlocking engagement with the semicircular shape of the central aperture 68 to couple the shaft 70 to the dynamic plate 64.

As best shown in FIG. 1, a handle 72 is mounted to the shaft 70 to actuate the clamping mechanism 38. The handle 72 is disposed adjacent the dynamic plate 64. Accordingly, rotating the handle 72 rotates the shaft 70 about the transverse axis 42, which in turn rotates the dynamic plate 64 coupled to the shaft 70 via the interlocking engagement between the central aperture 68 and the semicircular cross section of the shaft 70. The static plate 40, not being in interlocking engagement with the shaft 70, does not rotate with the shaft 70.

Figure 4:
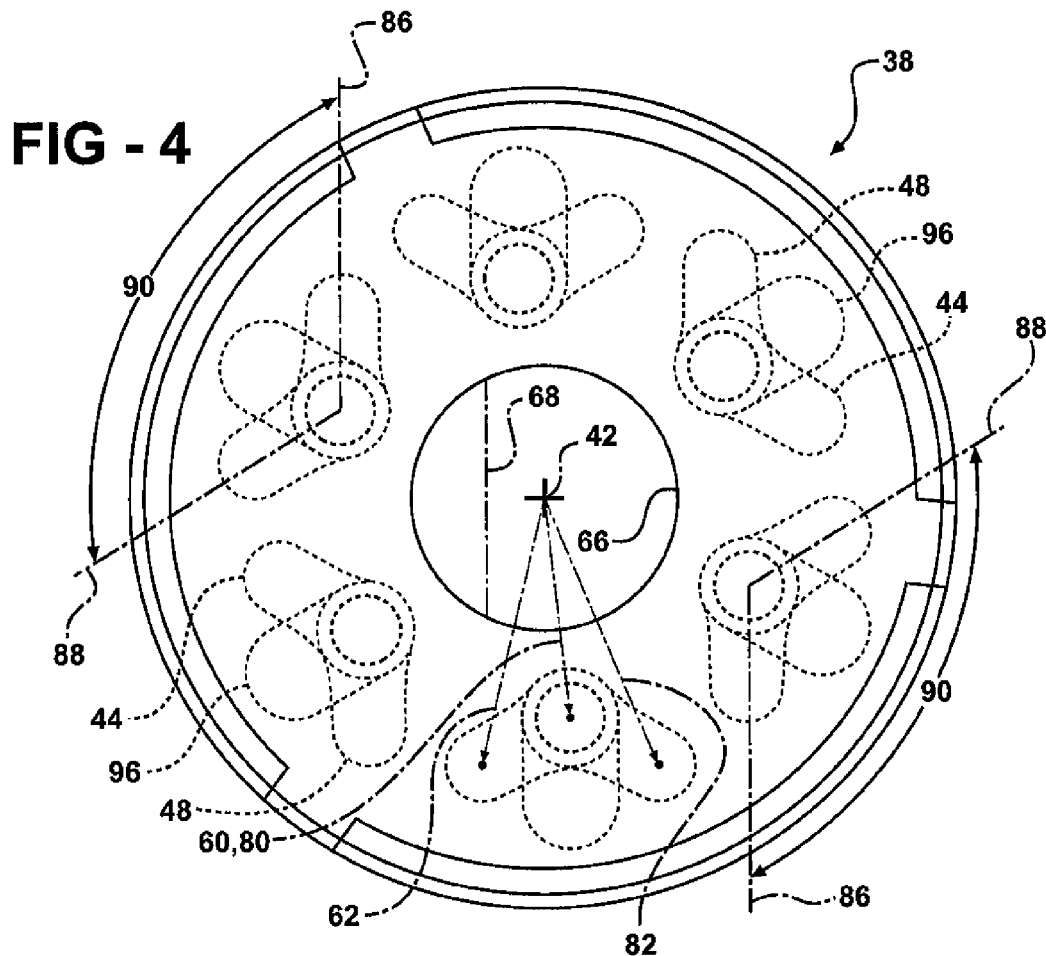
FIG. 4 is a plan view of the clamping mechanism.

Referring back to FIG. 9, the dynamic plate 64 defines a plurality of dynamic lifting ramps 48. As best shown in FIG. 4, each of the plurality of dynamic lifting ramps 48 opposes one of the plurality of static lifting ramps 44 to define opposing pairs of ramps 44, 48. The dynamic plate 64 includes an inner surface 74 facing inward toward the rake bracket 36. The inner surface 74 of the dynamic plate 64 opposes the outer surface 46 of the static plate 40. The plurality of dynamic lifting ramps 48 is recessed relative to the inner surface 74, i.e., the dynamic lifting ramps 48 are ramps that are depressed into the inner surface 74 of the dynamic plate 64.

Figure 10:
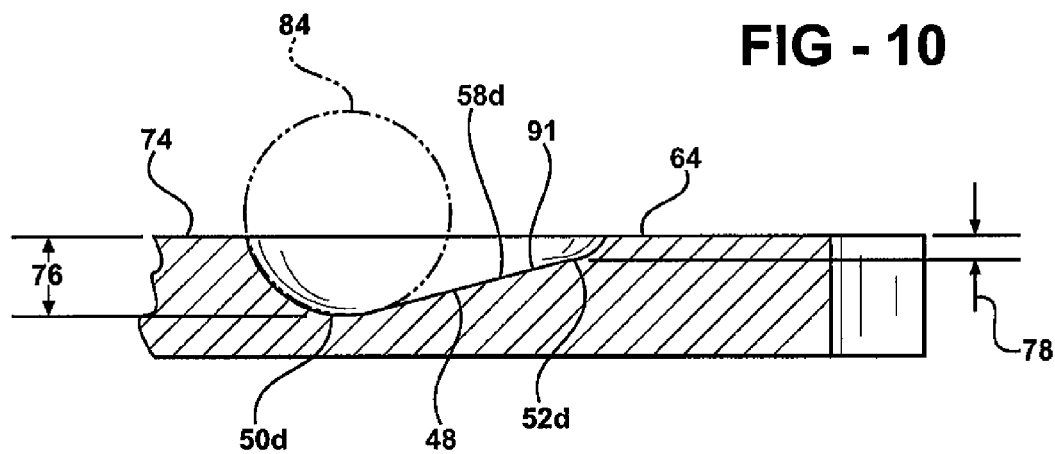
FIG. 10 is a cross sectional view of the dynamic plate of the clamping mechanism along cut line 10-10 shown in FIG. 9.

Referring to FIG. 10, each of the plurality of dynamic lifting ramps 48 includes a release section 50d and a lock section 52d. The release section 50d is spaced from the inner surface 74 of the dynamic plate 64 a second axial release distance 76, and the lock section 52d is spaced from the inner surface 74 of the dynamic plate 64 a second axial lock distance 78. The second axial lock distance 78 is less than the second axial release distance 76. Accordingly, it should be appreciated that each of the dynamic lifting ramps 48 includes an inclined profile 58d extending between the release section 50d of the dynamic lifting ramps 48 and the lock section 52d of the dynamic lifting ramps 48. The release section 50d defines the deepest part of the inclined profile 58d relative to the inner surface 74, with the lock section 52d defining the shallowest part of the inclined profile 58d relative to the inner surface 74.

Referring back to FIG. 9, the plurality of dynamic lifting ramps 48 is arranged in a spiral relationship relative to each other. Accordingly, the release section 50d of each of the plurality of dynamic lifting ramps 48 is spaced from the transverse axis 42 a second radial release distance 80. The lock section 52d of each of the plurality of dynamic lifting ramps 48 is spaced from the transverse axis 42 a second radial lock distance 82. The second radial lock distance 82 is less than the second radial release distance 80. Accordingly, it should be appreciated that the lock section 52d of each of the dynamic lifting ramps 48 is spaced closer to the transverse axis 42 than the release section 50d of each of the dynamic lifting ramps 48. It should also be appreciated that the relative position of the lock section 52d and the release section 50d may be reversed, with the second radial lock distance 82 being greater than the second radial release distance 80.

As shown in FIG. 4, the first radial release distance 60 of each of the plurality of static lifting ramps 44 is equal to the second radial release distance 80 of each of the plurality of dynamic lifting ramps 48. The first radial lock distance 62 of each of the plurality of static lifting ramps 44 is equal to the second radial lock distance 82 of each of the plurality of dynamic lifting ramps 48. Accordingly, the radial lock distances 62, 82 may either be less than or greater than the radial release distances 60, 80, so long as the first radial lock distance 62 of the static lifting ramps 44 is equal to the second radial lock distance 82 of the dynamic lifting ramps 48. Likewise, the radial release distances 60, 80 may either be less than or greater than the radial lock distances 62, 82, so long as the first radial release distance 60 of the static lifting ramps 44 is equal to the second radial release distance 80 of the dynamic lifting ramps 48.

Figure 5:
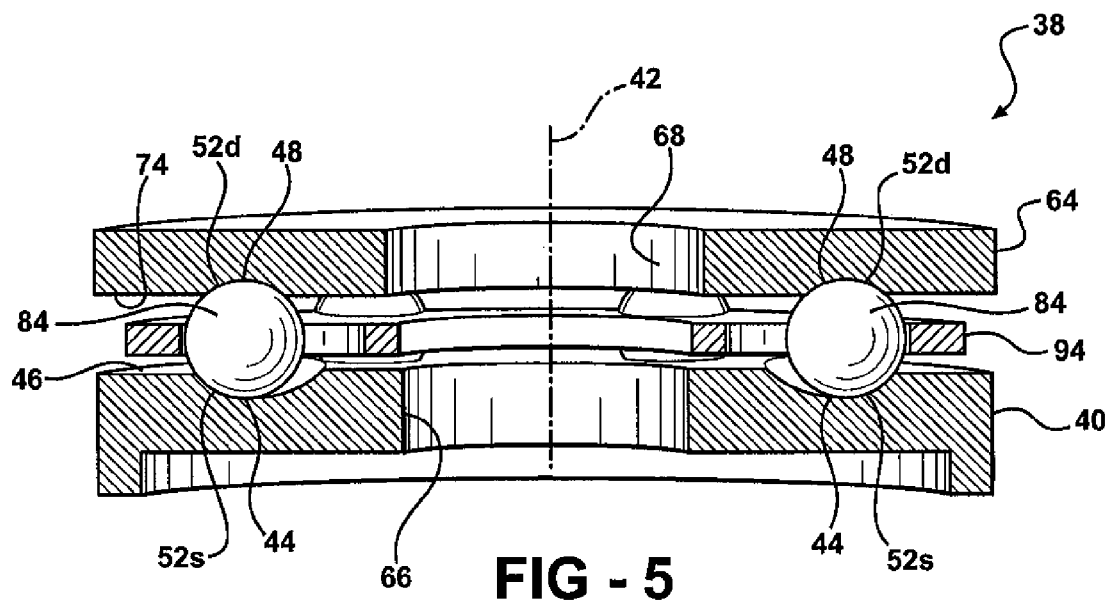
FIG. 5 is a cross sectional view of the clamping mechanism in a lock position.
Figure 6:
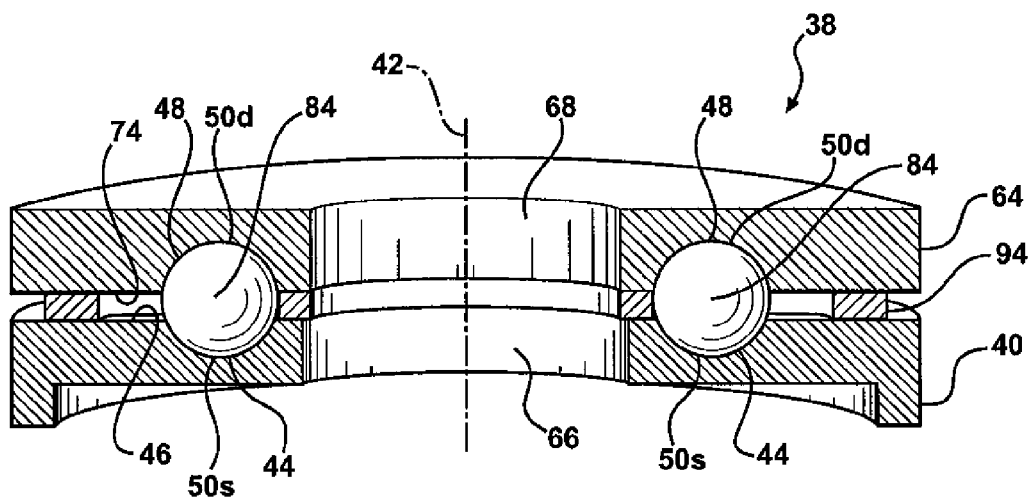
FIG. 6 is a cross sectional view of the clamping mechanism in a release position.

Referring back to FIG. 3, the clamping mechanism 38 further comprises a plurality of rollers 84. Referring also to FIGS. 5 and 6, each of the plurality of rollers 84 is disposed within one of the opposing pair ramps 44, 48, and is moveable between a raised position and a recessed position within the opposing pair of ramps 44, 48. The rollers 84 are in the raised position, sandwiched between the lock section 52s of the static lifting ramps 44 and the lock section 52d of the dynamic lifting ramps 48 when the dynamic plate 64 is in the lock position. The raised position biases the dynamic plate 64 outward along the transverse axis 42 away from the static plate 40 to compress the rake bracket 36 against the compression bracket 32. The rollers 84 are in the recessed position, sandwiched between the release section 50s of the static lifting ramps 44 and the release section 50d of the dynamic lifting ramps 48, when the dynamic plate 64 is in the release position. The recessed position permits axial movement of the dynamic plate 64 along the transverse axis 42 toward the static plate 40 to release the compressive force between the rake bracket 36 and the compression bracket 32, thereby permitting adjustment of the steering column assembly 20.

In operation, a user will rotate the handle 72 and thereby the dynamic plate 64. With the dynamic plate 64 in the lock position, the rollers 84 are disposed in the lock sections 52s, 52d of the opposing pairs of ramps 44, 48, in the raised position. Upon rotating the dynamic plate 64 into the release position, the rollers 84 move down the opposing pairs of ramps 44, 48 into the release section 50s, 50d of the opposing pairs of ramps 44, 48, in the recessed position. Similarly, with the dynamic plate 64 in the release position, the rollers 84 are disposed in the release section 50s, 50d of the opposing pair of ramps 44, 48, in the recessed position. Upon rotating the dynamic plate 64 into the lock position, the rollers 84 move up the opposing pairs of ramps 44, 48 into the lock section 52s, 52d of the opposing pairs of ramps 44, 48, in the raised position.

Referring to FIG. 7, the release sections 50s and the lock sections 52s of each of the plurality of static lifting ramps 44 are aligned along a first alignment 86. Referring also to FIG. 9, the release sections 50d and the lock sections 52d of each of the plurality of dynamic lifting ramps 48 are aligned along a second alignment 88. As best shown in FIG. 4, the second alignment 88 is substantially transverse to the first alignment 86, i.e., the first alignment 86 and the second alignment 88 of opposing pairs of ramps 44, 48 are aligned relative to each other to intersect or cross each other and define a skid angle 90 between the first alignment 86 and the second alignment 88 greater than twenty degrees (20°). The first alignment 86 and the second alignment 88 may include a linear alignment. Alternatively, the first alignment 86 and the second alignment 88 may include an arcuate alignment.

As the first alignment 86 and the second alignment 88 are disposed substantially transverse to each other, the rollers 84 within each of the opposing pairs of ramps 44, 48 move radially inward or radially outward relative to the transverse axis 42 as the dynamic plate 64 rotates relative to the static plate 40. The rollers 84 must stay within the overlapping section of the crossing pairs of opposing ramps 44, 48. Moving the dynamic plate 64 moves the overlapping area, thereby permitting movement of the rollers 84 up or down the opposing pair of ramps 44, 48. Having the opposing pair of ramps 44, 48 disposed substantially transverse to each other, thereby forcing the radial movement of the rollers 84 as the rollers 84 move up or down the inclined profiles 58s, 58d of the opposing pair of ramps 44, 48, prevents the rollers 84 from slipping or moving within the opposing pair of ramps 44, 48 absent any rotational movement of the dynamic plate 64 relative to the static plate 40.

Figure 11:
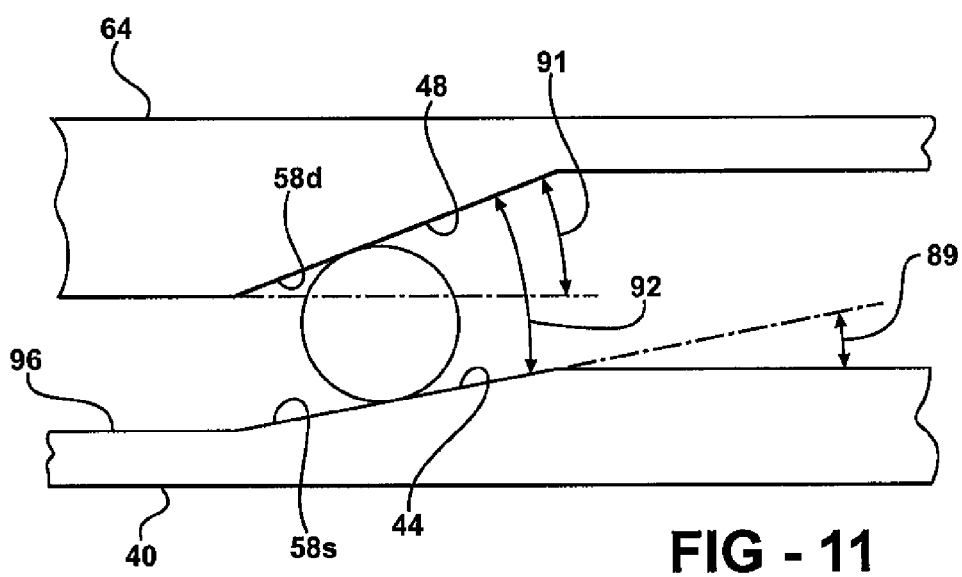
FIG. 11 is a schematic cross sectional view of the clamping mechanism.

As described above, with reference to FIG. 11, each of the plurality of static lifting ramps 44 includes an inclined profile 58s extending between the release section 50s and the lock section 52s of the static lifting ramps 44 and each of the plurality of dynamic lifting ramps 48 includes an inclined profile 58d extending between the release section 50d and the lock section 52d of the dynamic lifting ramps 48.

Each of the plurality of static lifting ramps 44 includes a first rate of change 89 along the inclined profile 58s of the static lifting ramps 44. The first rate of change 89 is measured relative to the outer surface 46 of the static plate 40. Each of the plurality of dynamic lifting ramps 48 includes a second rate of change 91 along the inclined profile 58d of the dynamic lifting ramps 48. The second rate of change 91 is measured relative to the inner surface 74 of the dynamic plate 64. The second rate of change 91 of the inclined profile 58d of the dynamic lifting ramps 48 is greater than the first rate of change 89 of the inclined profile 58s of the static lifting ramps 44. The larger second rate of change 91 of the inclined profile 58d of the dynamic lifting ramps 48 assists in preventing the rollers 84 from slipping between the opposing pairs of ramps 44, 48.

The clamping mechanism 38 may include an angular difference 92 (i.e., a wedge angle 92) between the second rate of change 91 of each of the plurality of dynamic lifting ramps 48 and the first rate of change 89 of each of the plurality of static lifting ramps 44. If utilized, the angular difference 92 is preferably equal to eight degrees (8°). However, it should be appreciated that the angular difference 92 may vary more than or less than the preferred eight degrees (8°). It should also be appreciated that the clamping mechanism 38 need not include the angular difference 92 between the second rate of change 91 of each of the plurality of dynamic lifting ramps 48 and the first rate of change 89 of each of the plurality of static lifting ramps 44.

Referring to FIG. 8, the first rate of change 89 of each of the plurality of static lifting ramps 44 may be constant. Alternatively, the first rate of change 89 may be variable along the inclined profile 58s of the static lifting ramps 44. The variable first rate of change 89 includes a constantly changing slope along the inclined profile 58s of the static lifting ramps 44, i.e., the inclined profile 58 of the static lifting ramps 44 includes a curved profile.

Referring to FIG. 10, the second rate of change 91 of each of the plurality of dynamic lifting ramps 48 may be constant. Alternatively, the second rate of change 91 may be variable along the inclined profile 58d of the dynamic lifting ramps 48. The variable second rate of change 91 includes a constantly changing slope along the inclined profile 58d of the dynamic lifting ramps 48, i.e., the inclined profile 58d of the dynamic lifting ramps 48 includes a curved profile.

Referring back to FIG. 3, a cage 94 is disposed between the static plate 40 and the dynamic plate 64. The cage 94 is an aid for positioning the plurality of rollers 84 within the pairs of opposing ramps 44, 48 during manufacture of the clamping mechanism 38 and the steering column assembly 20. It should be appreciated that the clamping mechanism 38 may be assembled without the cage 94 is so desired, and still function properly. The cage 94 defines a plurality of holes 96, with one of the plurality of rollers 84 disposed within each of the plurality of holes 96. Additionally, the cage 94 may include a spring 98 to bias the dynamic plate 64 into the release position.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A clamping mechanism for an adjustable steering column assembly, said clamping mechanism comprising:

a static plate defining a plurality of static lifting ramps with each of said plurality of static lifting ramps including a release section and a lock section, said static plate configured for attachment to the adjustable steering column assembly;

a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;

a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps;

said plurality of static lifting ramps spaced from said transverse axis a first radial release distance and said lock section of each of said plurality of static lifting ramps spaced from said transverse axis a first radial lock distance less than said first radial release distance said release section of each of said plurality of dynamic lifting ramps spaced from said transverse axis a second radial release distance, and said lock section of each of said plurality of dynamic lifting ramps spaced from said transverse axis a second radial lock distance less than said second radial release distance;

at least one of said plurality of static lifting ramps including a first rate of change along an inclined profile extending between said release section and said lock section of said static lifting ramps, and at least one of said plurality of dynamic lifting ramps including a second rate of change along an inclined profile extending between said release section and said lock section of said dynamic lifting ramps, at least one of said first rate of change and said second rate of change being variable.

2. A clamping mechanism as set forth in claim 1 wherein said static plate includes an outer surface with said plurality of static lifting ramps recessed relative to said outer surface and said dynamic plate includes an inner surface opposing said outer surface of said static plate with said plurality of dynamic lifting ramps recessed relative to said inner surface.

3. A clamping mechanism as set forth in claim 2 wherein said release section of each of said plurality of static lifting ramps is spaced from said outer surface of said static plate a first axial release distance and said lock section of each of said plurality of static lifting ramps is spaced from said outer surface of said static plate a first axial lock distance less than said first axial release distance.

4. A clamping mechanism as set forth in claim 3 wherein said release section of each of said plurality of dynamic lifting ramps is spaced from said inner surface of said dynamic plate a second axial release distance and said lock section of each of said plurality of dynamic lifting ramps is spaced from said inner surface of said dynamic plate a second axial lock distance less than said second axial release distance.

5. A clamping mechanism as set forth in claim 1 wherein said release section and said lock section of each of said plurality of static lifting ramps are aligned along a first alignment and said release section and said lock section of each of said plurality of dynamic lifting ramps are aligned along a second alignment substantially transverse to said first alignment.

6. A clamping mechanism as set forth in claim 5 wherein said first alignment and said second alignment are linear.

7. A clamping mechanism as set forth in claim 1 wherein said first radial release distance of each of said plurality of static lifting ramps is equal to said second radial release distance of each of said plurality of dynamic lifting ramps and wherein said first radial lock distance of each of said plurality of static lifting ramps is equal to said second radial lock distance of each of said plurality of dynamic lifting ramps.

8. A clamping mechanism as set forth in claim 1 further comprising an angular difference between said second rate of change of each of said plurality of dynamic lifting ramps and said first rate of change of each of said plurality of static lifting ramps equal to eight degrees.

9. A clamping mechanism as set forth in claim 1 further comprising a cage disposed between said static plate and said dynamic plate for positioning said plurality of rollers within said pairs of opposing ramps.

10. A clamping mechanism as set forth in claim 9 wherein said cage defines a plurality of holes with one of said plurality of rollers disposed within each of said plurality of holes.

11. A clamping mechanism for an adjustable steering column assembly, said clamping mechanism comprising:
   a static plate defining a plurality of static lifting ramps with each of said plurality of static lifting ramps including a release section and a lock section, said static plate configured for attachment to the adjustable steering column assembly;
   a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;
   a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps when said dynamic plate is in said release position to permit axial movement of said dynamic plate along said transverse axis toward said static plate;
   said plurality of static lifting ramps spaced from said transverse axis a first radial release distance and said lock section of each of said plurality of static lifting ramps spaced from said transverse axis a first radial lock distance less than said first radial release distance and said release section of each of said plurality of dynamic lifting ramps spaced from said transverse axis a second radial release distance and said lock section of each of said plurality of dynamic lifting ramps spaced from said transverse axis a second radial lock distance less than said second radial release distance;
   each of said plurality of static lifting ramps including an inclined profile extending between said release section and said lock section of said static lifting ramps and each of said plurality of dynamic lifting ramps including an inclined profile extending between said release section and said lock section of said dynamic lifting ramps;
   each of said plurality of static lifting ramps including a first rate of change along said inclined profile of said static lifting ramps relative to an outer surface of said static plate and each of said plurality of dynamic lifting ramps including a second rate of change along said inclined profile of said dynamic lifting ramps relative to an inner surface of said dynamic plate with said second rate of change greater than said first rate of change; and
   wherein said first rate of change of each of said plurality of static lifting ramps is variable along said inclined profile of said static lifting ramps.

12. A clamping mechanism for an adjustable steering column assembly, said clamping mechanism comprising:
   a static plate defining a plurality of static lifting ramps with each of said plurality of static lifting ramps including a release section and a lock section, said static plate configured for attachment to the adjustable steering column assembly;
   a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;
   a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps when said dynamic plate is in said release position to permit axial movement of said dynamic plate along said transverse axis toward said static plate;
   said plurality of static lifting ramps spaced from said transverse axis a first radial release distance and said lock section of each of said plurality of static lifting ramps spaced from said transverse axis a first radial lock distance less than said first radial release distance and said release section of each of said plurality of dynamic lifting ramps spaced from said transverse axis a second radial release distance and said lock section of each of said plurality of dynamic lifting ramps spaced from said transverse axis a second radial lock distance less than said second radial release distance;

each of said plurality of static lifting ramps including an inclined profile extending between said release section and said lock section of said static lifting ramps and each of said plurality of dynamic lifting ramps including an inclined profile extending between said release section and said lock section of said dynamic lifting ramps;

each of said plurality of static lifting ramps including a first rate of change along said inclined profile of said static lifting ramps relative to an outer surface of said static plate and each of said plurality of dynamic lifting ramps including a second rate of change along said inclined profile of said dynamic lifting ramps relative to an inner surface of said dynamic plate with said second rate of change greater than said first rate of change; and wherein said second rate of change of each of said plurality of dynamic lifting ramps is variable along said inclined profile of said dynamic lifting ramps.

13. A clamping mechanism for an adjustable steering column, said clamping mechanism comprising:

a static plate defining a plurality of static lifting ramps with each of said plurality of static lifting ramps including a release section and a lock section, said static plate configured for attachment to the adjustable steering column assembly;

a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;

a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps when said dynamic plate is in said release position to permit axial movement of said dynamic plate along said transverse axis toward said static plate;

said release section and said lock section of each of said plurality of static lifting ramps are aligned along a first alignment and said release section and said lock section of each of said plurality of dynamic lifting ramps are aligned along a second alignment different than said first alignment to permit radial movement of said plurality of rollers within said opposing pair of ramps relative to said transverse axis;

at least one of said plurality of static lifting ramps including a first rate of change along an inclined profile extending between said release section and said lock section of said static lifting ramps, and at least one of said plurality of dynamic lifting ramps including a second rate of change along an inclined profile extending between said release section and said lock section of said dynamic lifting ramps, at least one of said first rate of change and said second rate of change being variable.

14. A clamping mechanism as set forth in claim 13 wherein said first alignment and said second alignment are linear.

15. A clamping mechanism as set forth in claim 13 wherein a first radial release distance of each of said plurality of static lifting ramps is about equal to a second radial release distance of each of said plurality of dynamic lifting ramps and wherein a first radial lock distance of each of said plurality of static lifting ramps is about equal to a second radial lock distance of each of said plurality of dynamic lifting ramps.

16. A clamping mechanism as set forth in claim 13 further comprising an angular difference between a second rate of change of each of said plurality of dynamic lifting ramps and a first rate of change of each of said plurality of static lifting ramps of about eight degrees.

17. A clamping mechanism as set forth in claim 13 wherein said static plate includes an outer surface with said plurality of static lifting ramps recessed relative to said outer surface and said dynamic plate includes an inner surface opposing said outer surface of said static plate with said plurality of dynamic lifting ramps recessed relative to said inner surface.

18. A clamping mechanism as set forth in claim 17 wherein said release section of each of said plurality of static lifting ramps is spaced from said outer surface of said static plate a first axial release distance and said lock section of each of said plurality of static lifting ramps is spaced from said outer surface of said static plate a first axial lock distance less than said first axial release distance.

19. A clamping mechanism as set forth in claim 18 wherein said release section of each of said plurality of dynamic lifting ramps is spaced from said inner surface of said dynamic plate a second axial release distance and said lock section of each of said plurality of dynamic lifting ramps is spaced from said inner surface of said dynamic plate a second axial lock distance less than said second axial release distance.

20. A clamping mechanism for an adjustable steering column, said clamping mechanism comprising:

a static plate defining a plurality of static lifting ramps with each of said plurality of static lifting ramps including a release section and a lock section, said static plate configured for attachment to the adjustable steering column assembly;

a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;

a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps when said dynamic plate is in said release position to permit axial movement of said dynamic plate along said transverse axis toward said static plate;

said release section and said lock section of each of said plurality of static lifting ramps are aligned alignment and said release section and said lock section of each of said plurality of dynamic lifting ramps are aligned along a second alignment substantially transverse to said first alignment to permit radial movement of said plurality of rollers within said opposing pair of ramps relative to said transverse axis to guide said rollers between said recessed position and said raised position in response to rotation of said dynamic plate relative to said static plate;

said release section of each of said plurality of static lifting ramps spaced from said transverse axis a first radial release distance and said lock section of each of said plurality of static lifting ramps spaced from said transverse axis a first radial lock distance less than said first radial release distance, and said release section of each of said plurality of dynamic lifting ramps spaced from said transverse axis a second radial release distance and said lock section of each of said plurality of dynamic lifting ramps spaced from said transverse axis a second radial lock distance less than said second radial release distance;

each of said plurality of static lifting ramps including an inclined profile extending between said release section and said lock section of said static lifting ramps and each of said plurality of dynamic lifting ramps including an inclined profile extending between said release section and said lock section of said dynamic lifting ramps;

each of said plurality of static lifting ramps including a first rate of change along said inclined profile of said static lifting ramps relative to said outer surface of said static plate and each of said plurality of dynamic lifting ramps including a second rate of change along said inclined profile of said dynamic lifting ramps relative to said inner surface of said dynamic plate with said second rate of change greater than said first rate of change;

wherein said first rate of change of each of said plurality of static lifting ramps is variable along said inclined profile of said static lifting ramps.

21. A clamping mechanism for an adjustable steering column, said clamping mechanism comprising:

a static plate defining a plurality of static lifting ramps with each of said plurality of static lifting ramps including a release section and a lock section, said static plate configured for attachment to the adjustable steering column assembly;

a dynamic plate in spaced parallel relationship to said static plate and rotatable relative to said static plate between a lock position and a release position about a transverse axis extending perpendicular to said dynamic plate with said dynamic plate defining a plurality of dynamic lifting ramps with each of said plurality of dynamic lifting ramps including a release section and a lock section and opposing one of said plurality of static lifting ramps to define opposing pairs of ramps;

a plurality of rollers with each of said plurality of rollers disposed within one of said opposing pairs of ramps and moveable between a raised position within said opposing pair of ramps when said dynamic plate is in said lock position to bias said dynamic plate outward along said transverse axis away from said static plate and a recessed position within said opposing pair of ramps when said dynamic plate is in said release position to permit axial movement of said dynamic plate along said transverse axis toward said static plate;

said release section and said lock section of each of said plurality of static lifting ramps are aligned along a first alignment and said release section and said lock section of each of said plurality of dynamic lifting ramps are aligned along a second alignment substantially transverse to said first alignment to permit radial movement of said plurality of rollers within said opposing pair of ramps relative to said transverse axis to guide said rollers between said recessed position and said raised position in response to rotation of said dynamic plate relative to said static plate;

said release section of each of said plurality of static lifting ramps spaced from said transverse axis a first radial release distance and said lock section of each of said plurality of static lifting ramps spaced from said transverse axis a first radial lock distance less than said first radial release distance, and said release section of each of said plurality of dynamic lifting ramps spaced from said transverse axis a second radial release distance and said lock section of each of said plurality of dynamic lifting ramps spaced from said transverse axis a second radial lock distance less than said second radial release distance;

each of said plurality of static lifting ramps including an inclined profile extending between said release section and said lock section of said static lifting ramps and each of said plurality of dynamic lifting ramps including an inclined profile extending between said release section and said lock section of said dynamic lifting ramps;

each of said plurality of static lifting ramps including a first rate of change along said inclined profile of said static lifting ramps relative to said outer surface of said static plate and each of said plurality of dynamic lifting ramps including a second rate of change along said inclined profile of said dynamic lifting ramps relative to said inner surface of said dynamic plate with said second rate of change greater than said first rate of change;

wherein said second rate of change of each of said plurality of dynamic lifting ramps is variable along said inclined profile of said dynamic lifting ramps.

\* \* \* \* \*